(No Model.)

W. G. ROBB.
PIPE COUPLING.

No. 319,853.  Patented June 9, 1885.

WITNESSES

INVENTOR

UNITED STATES PATENT OFFICE.

WALTER G. ROBB, OF SCOTT, ALLEGHENY COUNTY, PENNSYLVANIA.

PIPE-COUPLING.

SPECIFICATION forming part of Letters Patent No. 319,853, dated June 9, 1885.

Application filed February 25, 1885. (No model.)

*To all whom it may concern:*

Be it known that I, WALTER G. ROBB, of Scott township, in the county of Allegheny and State of Pennsylvania, have invented certain new and useful Improvements in Pipe-Couplings; and I do hereby declare the following to be a full, clear, and exact description of the invention, such as will enable others skilled in the art to which it pertains to make and use the same.

My invention relates to pipe-couplings specially adapted to secure the meeting ends of pipes used in conveying natural gas.

It is well known that pipes for natural gas require absolutely-tight couplings to prevent leakage; and my invention consists in a coupling-sleeve interiorly threaded to receive the screw-threaded ends of the pipe-sections and formed with extensions at each end of peculiar construction, as hereinafter fully described.

Figure 1:
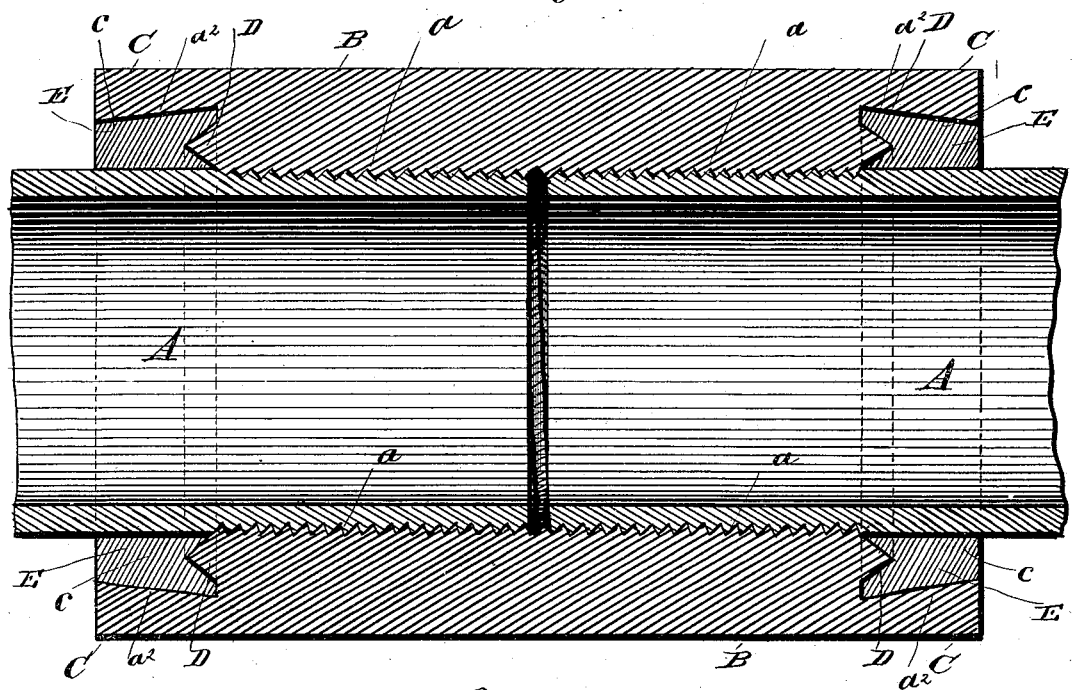
Figure 2:
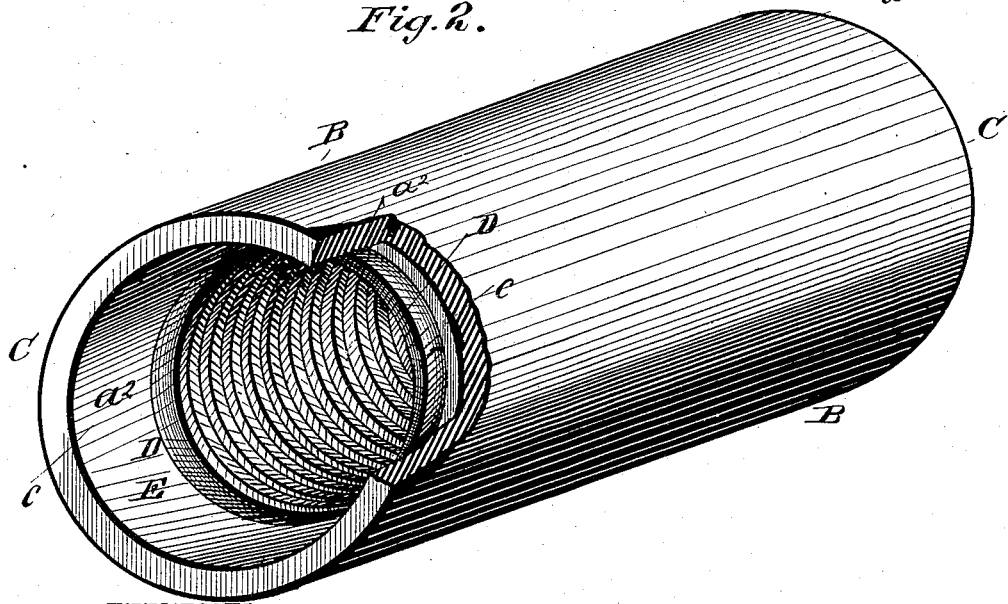

In the accompanying drawings, Figure 1 represents a longitudinal central section of two pipe ends connected by my improved coupling-sleeve. Fig. 2 is a perspective view of the sleeve detached.

A A represent the ends of two pipe-sections, each formed with screw-threads $a$ $a$.

B represents the coupling-sleeve, interiorly threaded to receive the ends of the pipes. Each end of the sleeve B is formed with an extension, C, recessed to form an annular space, $c$, and formed with an annular wedge-shaped flange, D. After the sleeve has been secured upon the pipes, as shown in Fig. 1, the space E between the end extensions and the pipes is filled with calking material of any suitable quality, preferably lead. After the calking is applied it is driven in firmly or calked, and the wedge-like flanges D D' will separate the inner edges of the calks and securely wedge the latter between the sleeve-extensions and the pipes. The harder the lead is driven the tighter will be the wedge action, thus insuring a secure joint.

The inner faces, $a^2$, of the annular sleeve-extensions are beveled, so that the outer ends of the spaces $c$ $c$ will be contracted to afford a dovetail space for the lead to prevent its removal.

I am aware that it is common to connect screw-threaded pipes by interiorly-threaded nuts or sleeves; hence I make no claim to that idea, broadly; but the essence of my improvement is found in the dovetail cavity having the wedge-flanges for separating the inner edge of the calking, and forcing the latter tightly against the pipes and sleeve-extensions.

Having fully described my invention, what I claim as new, and desire to secure by Letters Patent, is—

1. In a pipe-coupling, the combination, with the threaded ends of the pipe-sections, of an interiorly-threaded sleeve whose ends are recessed to form beveled seats to receive calking, and annular wedge-shaped flanges D, substantially as set forth.

2. In a pipe-coupling, the combination, with the threaded ends of the pipe-section, of a sleeve into which said ends are screwed, said sleeve having end extensions interiorly beveled, and being formed with a wedge-shaped flange, so that the inner face of the calking of the coupling will be spread to tighten the joint when driven to place, substantially as set forth.

3. The combination, with the pipe ends, of a screw-threaded sleeve formed with end extensions and wedge-shaped flanges, and calking driven into the spaces between the pipes and sleeve-extensions, said calking being separated at its inner edge by contact with the wedge-flanges and driven securely into place, substantially as set forth.

In testimony whereof I have signed this specification in the presence of two subscribing witnesses.

WALTER G. ROBB.

Witnesses:
F. O. McCLEARY,
F. B. HANNA.